US010539076B2

(12) United States Patent
Niergarth et al.

(10) Patent No.: US 10,539,076 B2
(45) Date of Patent: Jan. 21, 2020

(54) SELF-CONTAINED LUBRICATION COOLING SYSTEM WITH HEAT EXCHANGER INTEGRATED WITH SUMP

(71) Applicant: General Electric Company, Schenectady, NY (US)

(72) Inventors: Daniel Alan Niergarth, Cincinnati, OH (US); Brandon Wayne Miller, Middletown, OH (US); Kyle Robert Snow, Loveland, OH (US); Christopher James Kroger, West Chester, OH (US)

(73) Assignee: General Electric Company, Schenectady, NY (US)

( * ) Notice: Subject to any disclaimer, the term of this patent is extended or adjusted under 35 U.S.C. 154(b) by 248 days.

(21) Appl. No.: 14/937,266

(22) Filed: Nov. 10, 2015

(65) Prior Publication Data

US 2017/0130606 A1 May 11, 2017

(51) Int. Cl.
*F02C 7/14* (2006.01)
*F01D 25/20* (2006.01)
(Continued)

(52) U.S. Cl.
CPC .............. *F02C 7/14* (2013.01); *F01D 25/20* (2013.01); *F16N 9/02* (2013.01); *F01D 25/02* (2013.01); *F05D 2260/98* (2013.01)

(58) Field of Classification Search
CPC ......... F01M 2011/0025; F16N 2210/02; F16N 2210/08; F05D 2260/213; F05D 2260/98;
(Continued)

(56) References Cited

U.S. PATENT DOCUMENTS 3,043,560 A * 7/1962 Varadi ..................... F01D 25/12
416/174
3,528,241 A * 9/1970 Gill, Jr. ..................... F02C 7/06
60/39.08

(Continued)

FOREIGN PATENT DOCUMENTS

EP   1 895 124 A2   3/2008
EP   1 916 399 A2   4/2008
(Continued)

OTHER PUBLICATIONS

John Pike, Chapter 5: Lubricating Systems, 2013, globalsecurity.org, subheading Oil System Components, accessed on Dec. 13, 2017 at https://www.globalsecurity.org/military/library/policy/army/fm/1-506/Ch5.htm.*

(Continued)

*Primary Examiner* — Gerald L Sung
*Assistant Examiner* — Stephanie Cheng
(74) *Attorney, Agent, or Firm* — General Electric; James Reed (57) ABSTRACT

A self-contained lubrication fluid circulation system for use with a gas turbine engine defining a core air flowpath includes a sump configured to collect lubrication fluid and a heat source coupled in fluid communication with the sump and configured to transfer heat to the lubrication fluid. The system also includes a heat sink positioned within the sump and coupled in fluid communication with the heat source. A lubrication fluid conduit of the system is configured to channel the lubrication fluid between the heat source and the heat sink, wherein the lubrication fluid conduit is positioned entirely within the sump.

15 Claims, 5 Drawing Sheets

(51) Int. Cl.
*F16N 9/02* (2006.01)
*F01D 25/02* (2006.01)

(58) Field of Classification Search
CPC ........ F05D 25/18; F05D 25/183; F05D 25/20; F01P 11/08; F02C 9/18; F02C 9/52; F02C 7/18
See application file for complete search history.

(56) References Cited

U.S. PATENT DOCUMENTS

| | | | |
|---|---|---|---|
| 4,027,928 A | 6/1977 | Williams | |
| 4,041,697 A | 8/1977 | Coffinberry et al. | |
| 4,722,666 A * | 2/1988 | Dennison | A61M 1/101 416/174 |
| 4,887,424 A * | 12/1989 | Geidel | F01D 25/20 416/170 R |
| 5,408,965 A | 4/1995 | Fulton et al. | |
| 5,544,700 A | 8/1996 | Shagoury | |
| 5,678,461 A | 10/1997 | Stine | |
| 6,217,758 B1 | 4/2001 | Lee | |
| 6,580,179 B2 | 6/2003 | Eccles et al. | |
| 6,990,797 B2 * | 1/2006 | Venkataramani | F02C 7/047 244/134 R |
| 7,631,485 B2 * | 12/2009 | Suciu | F01D 15/12 60/226.1 |
| 7,726,113 B2 * | 6/2010 | Orlando | F02C 3/107 415/61 |
| 7,832,193 B2 * | 11/2010 | Orlando | F01D 15/12 415/61 |
| 7,993,425 B2 * | 8/2011 | Corattiyil | F16N 39/002 138/89 |
| 8,453,440 B2 | 6/2013 | Busch | |
| 8,585,358 B2 | 11/2013 | Matsuo et al. | |
| 10,087,840 B2 * | 10/2018 | Ward | F01D 25/02 |
| 2005/0236139 A1 | 10/2005 | Konruff et al. | |
| 2006/0042223 A1 * | 3/2006 | Walker | F01D 9/065 60/39.08 |
| 2009/0134243 A1 * | 5/2009 | Mount | F01D 25/18 239/265.27 |
| 2014/0140829 A1 | 5/2014 | Blair et al. | |
| 2014/0271118 A1 | 9/2014 | Junod | |
| 2015/0125264 A1 | 5/2015 | Lighty et al. | |
| 2016/0298543 A1 * | 10/2016 | Suciu | F01D 25/20 |
| 2017/0096938 A1 * | 4/2017 | Kenworthy | F02C 7/06 |
| 2017/0175630 A1 * | 6/2017 | Sibilli | F02C 7/12 |
| 2018/0195413 A1 * | 7/2018 | Snape | F01D 25/18 |

FOREIGN PATENT DOCUMENTS

| | | |
|---|---|---|
| EP | 2 696 056 A2 | 2/2014 |
| FR | 2 960 908 A1 | 12/2011 |
| GB | 2496852 A | 5/2013 |
| WO | 9525903 | 9/1995 |

OTHER PUBLICATIONS

Extended European Search Report and Opinion issued in connection with corresponding EP Application No. 16195557.0 dated Apr. 11, 2017.

* cited by examiner

SELF-CONTAINED LUBRICATION COOLING SYSTEM WITH HEAT EXCHANGER INTEGRATED WITH SUMP

STATEMENT REGARDING FEDERALLY SPONSORED RESEARCH AND DEVELOPMENT

This invention was made with Government support under contract number FA8650-09-D-2922 awarded by the United States Air Force. The Government has certain rights in this invention.

BACKGROUND

The present disclosure generally relates to systems and methods of oil scavenging systems in an aircraft engine. More particularly, this disclosure relates to closed loop oil scavenge systems within the sump of the gas turbine engine that includes an integrated heat exchanger.

At least some known gas turbine engines, such as turbofans, include a fan, a core engine, and a power turbine. The core engine includes at least one compressor, a combustor, and a high-pressure turbine coupled together in a serial flow relationship. More specifically, the compressor and high-pressure turbine are coupled through a shaft to form a high-pressure rotor assembly. Air entering the combustor is mixed with fuel and ignited to form a high energy gas stream. The high energy gas stream flows through the high-pressure turbine to rotatably drive the high-pressure turbine such that the shaft rotatably drives the compressor. The gas stream expands as it flows through a power or low-pressure turbine positioned aft of the high-pressure turbine. The low-pressure turbine includes a rotor assembly having a fan coupled to a drive shaft. The low-pressure turbine rotatably drives the fan through the drive shaft.

The compressor and the turbine are generally coupled through one or more shafts. Additionally, rotation of certain components of the compressor, turbine, and the one or more shafts is facilitated by a plurality of bearings. These bearings are provided with lubrication oil throughout operation of the gas turbine engine to, e.g., remove heat from such bearings and reduce an amount of friction within such bearings.

At least some known gas turbine engines include a lubrication oil circulation assembly for providing lubrication oil to each of the plurality of bearings, and further for pumping out, or scavenging, lubrication oil from one or more sumps provided for collecting and/or containing such lubrication oil. The lubrication oil circulation assembly typically includes at least one pump, a heat exchanger positioned outside of the core air flowpath, and one or more supply lines or scavenge lines extending through the core air flowpath to reach, e.g., the bearings and the one or more sumps. However, the supply lines and scavenge lines extending through the core air flowpath may disrupt an airflow through the core air flowpath. Accordingly, a means for reducing a size and/or amount of lubrication oil supply lines and/or scavenge lines extending through the core air flowpath is desired.

BRIEF DESCRIPTION

In one aspect, a self-contained lubrication fluid circulation system for use with a gas turbine engine defining a core air flowpath is provided. The lubrication fluid circulation system includes a sump configured to collect lubrication fluid and a heat source coupled in fluid communication with the sump and configured to transfer heat to the lubrication fluid. The system also includes a heat sink positioned within the sump and coupled in fluid communication with the heat source. A lubrication fluid conduit of the system is configured to channel the lubrication fluid between the heat source and the heat sink, wherein the lubrication fluid conduit is positioned entirely within the sump.

In another aspect, a method of treating a lubrication fluid with a lubrication fluid recirculation system within a gas turbine engine that defines a core air flowpath is provided. The method includes channeling lubrication fluid from a heat source to a sump via a lubrication fluid conduit, wherein the heat source transfers heat to the lubrication fluid. The lubrication fluid is then collected within the sump. The method also includes channeling the lubrication fluid via the lubrication fluid conduit to a heat sink positioned within and coupled in fluid communication with the sump. The lubrication fluid is then channeled via the lubrication fluid conduit from the heat sink to the heat source, wherein the lubrication fluid is not channeled through the core air flowpath between the heat source and the heat sink.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extends substantially parallel to a centerline of the turbine engine. Moreover, the terms "radial" and "radially" refer to directions and orientations that extends substantially perpendicular to the centerline of the turbine engine.

The exemplary systems and methods described herein relate to oil circulation systems that overcome at least some disadvantages of known systems and methods for circulating oil through a gas turbine engine. Moreover, the systems and methods described herein enable a sealed oil circulation system that includes in-sump lubrication pumping, filtration, and conditioning. More specifically, the self-contained circulation system described herein includes a sump configured to collect lubrication fluid and a heat source, such as bearings, coupled in fluid communication with the sump and configured to transfer heat to the lubrication fluid. The system also includes a heat sink, such as a heat exchanger, positioned within the sump and coupled in fluid communication with the heat source. A lubrication fluid conduit channels the lubrication fluid between the heat source and the heat sink, wherein the lubrication fluid conduit is positioned entirely within the sump such that the conduit channels lubrication fluid between various components of the oil circulation system without channeling the lubrication fluid across a core air flowpath of the gas turbine engine.

Advantages of the systems and methods described herein include the ability to position the oil treatment devices of the circulation system within the sump to prevent channeling the lubrication fluid across a core air flowpath of the gas turbine engine. As such, fewer or smaller scavenge lines and pumps are necessary to channel the oil greater distances. Accordingly, the above described oil circulation system enables reducing both the weight and complexity of the aircraft engine. Additionally, because the above described oil circulation system is sealed within the sump, there are no fluid lines associated with the circulation system extending through the core air flowpath of the engine to an oil tank external to the sump. As such, the core air flowpath includes less head loss and enables an increase in engine efficiency. Another benefit of the above described oil circulation system is reduced under-cowl heat exchanger size and packaging requirements. By cooling the fluid in the sump and not piping any to an under-cowl mounted heat exchanger, more space is allotted up for other externals components.

Figure 1:
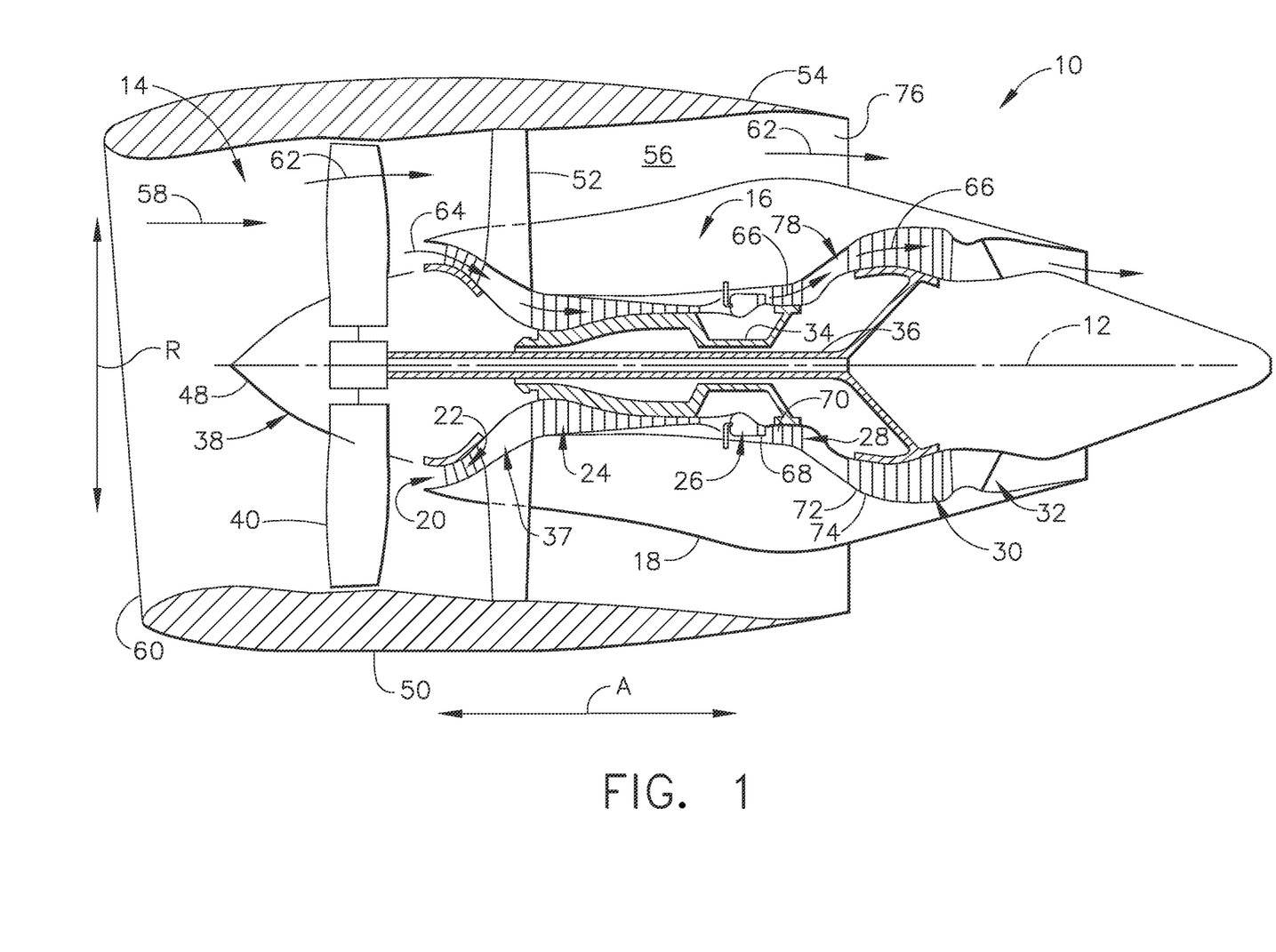
FIG. 1 is a schematic, cross-sectional view of an exemplary gas turbine engine.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, turbofan engine 10 defines an axial direction A (extending parallel to a longitudinal centerline 12 provided for reference) and a radial direction R. In general, turbofan 10 includes a fan section 14 and a core turbine engine 16 disposed downstream from fan section 14.

Core turbine engine 16 depicted generally in FIG. 1 includes a substantially tubular outer casing 18 that defines an annular inlet 20. Outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects HP turbine 28 to HP compressor 24. A low pressure (LP) shaft or spool 36 drivingly connects LP turbine 30 to LP compressor 22. The compressor section, combustion section 26, turbine section, and nozzle section 32 together define a core air flowpath 37.

For the embodiment depicted, fan section 14 includes a fan 38 having a plurality of fan blades 40. A rotatable front hub 48 is aerodynamically contoured to promote an airflow through fan blades 40 and is positioned at a forward end of fan section 14. Additionally, exemplary fan section 14 includes an annular fan casing or outer nacelle 50 that circumferentially surrounds fan 38 and/or at least a portion of core turbine engine 16. It should be appreciated that nacelle 50 may be configured to be supported relative to core turbine engine 16 by a plurality of circumferentially-spaced outlet guide vanes 52. Moreover, in one embodiment, a downstream section 54 of nacelle 50 extends over an outer portion of core turbine engine 16 so as to define a bypass airflow passage 56 therebetween.

During operation of turbofan engine 10, a volume of air 58 enters turbofan 10 through an associated inlet 60 of nacelle 50 and/or fan section 14. As volume of air 58 passes across fan blades 40, a first portion of air 58, as indicated by arrows 62, is directed or routed into bypass airflow passage 56 and a second portion of air 58 as indicated by arrow 64 is directed or routed into core air flowpath 37, or more specifically into LP compressor 22. The ratio between first portion of air 62 and second portion of air 64 is commonly known as a bypass ratio. The pressure of second portion of air 64 is then increased as it is routed through high pressure (HP) compressor 24 and into combustion section 26, where it is mixed with fuel and burned to provide combustion gases 66.

Combustion gases 66 are routed through HP turbine 28 where a portion of thermal and/or kinetic energy from combustion gases 66 is extracted via sequential stages of HP turbine stator vanes 68 that are coupled to outer casing 18 and HP turbine rotor blades 70 that are coupled to HP shaft or spool 34, thus causing HP shaft or spool 34 to rotate, thereby supporting operation of HP compressor 24. Combustion gases 66 are then routed through LP turbine 30 where a second portion of thermal and kinetic energy is extracted from combustion gases 66 via sequential stages of LP turbine stator vanes 72 that are coupled to outer casing 18 and LP turbine rotor blades 74 that are coupled to LP shaft or spool 36, thus causing LP shaft or spool 36 to rotate, thereby supporting operation of LP compressor 22 and/or rotation of fan 38.

Combustion gases 66 are subsequently routed through jet exhaust nozzle section 32 of core turbine engine 16 to provide propulsive thrust. Simultaneously, the pressure of first portion of air 62 is substantially increased as first portion of air 62 is routed through bypass airflow passage 56 before it is exhausted from a fan nozzle exhaust section 76 of turbofan 10, also providing propulsive thrust. HP turbine 28, LP turbine 30, and jet exhaust nozzle section 32 at least partially define a hot gas path 78 for routing combustion gases 66 through core turbine engine 16.

It should be appreciated, however, that turbofan engine 10 depicted in FIG. 1 is provided by way of example only and that in other exemplary embodiments, turbofan engine 10 may have any other suitable configuration. For example, in other embodiments, turbofan engine 10 may be configured as a geared turbofan engine, such that LP shaft 36 drives fan 38 across a power gearbox. Additionally, or alternatively, turbofan engine 10 may be an unducted/open rotor turbofan engine. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, electric propulsion systems, etc.

Figure 2:
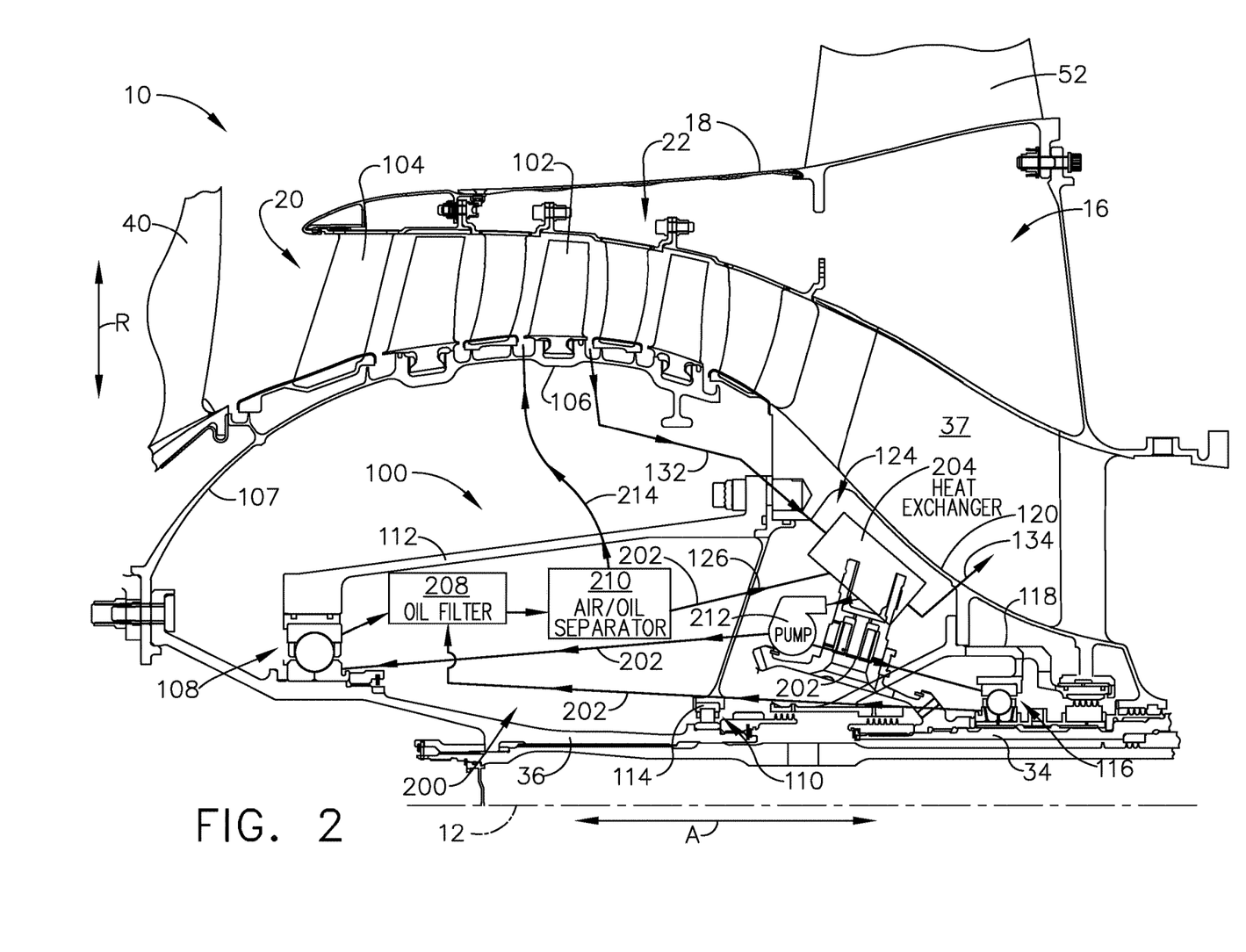
FIG. 2 is a schematic, cross-sectional side view of a forward end of a core of the exemplary gas turbine engine shown in FIG. 1 illustrating an exemplary oil circulation system.

Referring now to FIG. 2, a schematic, cross-sectional view of a forward end of turbofan engine 10 of FIG. 1 is provided. Specifically, FIG. 2 provides a close-up, cross-sectional view of a forward sump 100 of turbofan engine 10.

As shown in FIG. 2, forward sump 100 is positioned radially inward from core air flowpath 37, or more particularly, radially inward from a portion of core air flowpath 37 extending through LP compressor 22 of the compressor section. LP compressor 22 is configured to receive a flow of air from fan 38 through inlet 20 and compress such air using a plurality of rotating LP compressor rotor blades 102. LP compressor 22 depicted also includes an inlet guide vane 104 positioned proximate inlet 20, forward of the plurality of LP compressor rotor blades 102. Plurality of LP compressor rotor blades 102 are coupled at a radially inner end to a drum-type LP compressor rotor 106. LP compressor rotor 106 is attached to a structural member 107, which extends forward and connects to one or more rotational components of fan section 14. Notably, as discussed above, LP shaft 36 is driven by LP turbine 30, and in turn drives fan 38, and plurality of fan blades 40, along with LP compressor 22.

Additionally, a first forward LP bearing assembly 108 and a second forward LP bearing assembly 110 are provided to stabilize LP shaft 36 at a forward end and to facilitate rotation of LP shaft 36. First forward LP bearing assembly 108 is attached at a radially inner end to LP shaft 36 and at a radially outer end to a forward LP frame member 112. Similarly, second forward LP bearing assembly 110 is coupled at a radially inner end to LP shaft 36 and a radially outer end to an aft LP frame member 114. Forward and aft LP frame members 112, 114 are each stationary frame members. Moreover, for the embodiment depicted, first forward LP bearing assembly 108 is positioned forward of second forward LP bearing assembly 110 and includes a ball bearing. By contrast, second forward LP bearing assembly 110 includes a roller bearing. However, in other exemplary embodiments, any other suitable bearings may be included with first and/or second forward LP bearing assemblies 108, 110. Additionally, in other exemplary embodiments, any other suitable bearing configuration may be provided to facilitate rotation of LP shaft 36. For example, in other exemplary embodiments, a single bearing assembly may be provided to facilitate rotation of LP shaft 36 at the forward end.

As is also depicted, an HP shaft 34 is concentric with LP shaft 36 and positioned radially outward of LP shaft 36. HP shaft 34 is rotated by HP turbine 28 and is configured to drive HP compressor 24 (see FIG. 1). A forward HP bearing assembly 116 is provided to facilitate rotation of HP shaft 34 at a forward end of HP shaft 34. Specifically, a radially inner end of forward HP bearing assembly 116 is attached to HP shaft 34 and a radially outer end of forward HP bearing assembly 116 is attached to a stationary HP frame member 118. For the embodiment depicted, forward HP bearing assembly 116 includes a single ball bearing. However, in other embodiments, forward HP bearing assembly 116 may additionally include one or more other bearings positioned at any suitable location. Additionally or alternatively, in other embodiments, any other suitable bearing, or combination of bearings, may be included with forward HP bearing assembly 116 to facilitate rotation of HP shaft 34.

Referring still to FIG. 2, first forward LP bearing assembly 108, second forward LP bearing assembly 110, and forward HP bearing assembly 116 are all positioned at least partially within forward sump 100 of turbofan engine 10. Forward sump 100 is located radially inward of core air flowpath 37 and is defined at least in part by certain stationary frame members of core 16, such as forward LP frame member 112, stationary HP frame member 118, and a radially inner liner 120 defining a portion of core air flowpath 37 between LP compressor 22 and HP compressor 24. Additionally, forward sump 100 is defined at a radially inner side by a portion of LP shaft 36 and HP shaft 34.

A lubrication fluid, such as oil, is provided to forward sump 100, or more particularly to the plurality of bearings positioned at least partially within forward sump 100, to remove heat from such bearings and reduce an amount of friction within such bearings. In the exemplary embodiment, turbofan engine 10 includes a self-contained lubrication oil circulation system 200 including an oil conduit 202 for providing lubrication oil to plurality of bearings 108, 110, and 116. The entirety of conduit 202 is positioned with sump 100 and does not extend through core air flowpath 37 such that conduit 202 channels oil between various components of oil circulation system without channeling the oil across core air flowpath 37.

Once the lubrication oil is provided to the plurality of bearings, the lubrication oil may absorb an amount of heat generated by bearings 108, 110, and 116 while reducing the amount of friction in bearings 108, 110, and 116. Forward sump 100 is provided to contain and collect the lubrication oil that has been provided to the plurality of bearings positioned at least partially therein. Additionally, forward sump 100 defines a collection chamber 124 wherein the lubrication oil is configured to flow and collect after having passed over or through the plurality of bearings. The flow of lubrication oil from the plurality of bearings is indicated by arrows 126 in FIG. 2. Once in collection chamber 124, circulation system 200 channels the oil through various components of system 200, described in further detail below, to treat the oil for subsequent use by bearings 108, 110, and 116.

In the exemplary embodiment circulation system 200 includes a heat sink, for example, a heat exchanger 204 positioned within sump 100 and coupled in fluid communication with a heat source, such as bearings 108, 110, and 116. Heat exchanger 204 is coupled in direct thermal communication with forward sump 100 for removing heat from the lubrication oil contained therein. For the embodiment depicted, heat exchanger 204 is positioned at least partially within forward sump 100, or more particularly, is positioned at least partially within collection chamber 124 defined by forward sump 100. Accordingly, heat exchanger 204 may reduce a temperature of the lubrication oil prior to such lubrication oil being channeled to bearings 108, 110, and 116.

In the exemplary embodiment, heat exchanger 204 is configured as an air-to-liquid heat exchanger. Specifically, heat exchanger 204 is configured to receive a cooling airflow 132 from LP compressor 22 and to transfer heat from the lubrication oil in forward sump 100 to cooling airflow 132. Cooling airflow 132, after having absorbed an amount of heat from the lubrication oil within forward sump 100 is termed exhaust airflow 134 and is then exhausted back into core air flowpath 37. However, in other exemplary embodiments, exhaust airflow 134 may instead be exhausted to any other suitable location. For example, in other exemplary embodiments, exhaust airflow 134 may be exhausted, e.g., to bypass passage 56 (shown in FIG. 1), or to the atmosphere. Notably, although for the embodiment depicted cooling airflow 132 provided from LP compressor 22 is provided from a location proximate a second stage of LP compressor 22, in other embodiments, cooling airflow 132 may be provided from any other suitable location within LP compressor 22. Alternatively, cooling airflow 132 may be provided from a location upstream from LP compressor 22 or downstream from LP compressor 22. Moreover, as will be described in greater detail below, in still other exemplary embodiments, cooling airflow 132 may additionally, or alternatively, be provided directly from fan 38.

In the exemplary embodiment, turbofan engine 10 includes a single heat exchanger 204 positioned in direct thermal communication with forward sump 100 for removing an amount of heat from the lubrication oil within such sump 100 before such lubrication oil is channeled to bearings 108, 110, and 116 for use. For example, referring now also to FIG. 3, an axial, cross-sectional view is provided of collection chamber 124 defined by exemplary forward sump 100 of FIG. 2. Collection chamber 124 is defined by forward sump 100 and generally includes an enlarged portion proximate a bottom portion of forward sump 100. The enlarged portion, which is referred to herein as a "bathtub" 136, may be positioned at a bottom portion of forward sump 100, such that gravity may assist with the collection of lubrication oil therein. For the embodiment depicted, heat exchanger 204 is configured as a single heat exchanger positioned within bathtub 136 of forward sump 100. Additionally, in the exemplary embodiment, heat exchanger 204 includes a plurality of heat dissipation features 206, such as channels or fins, extending at least partially through forward sump 100, with the cooling medium (e.g., cooling airflow 132 from LP compressor 22) flowing therethrough.

Figure 3:
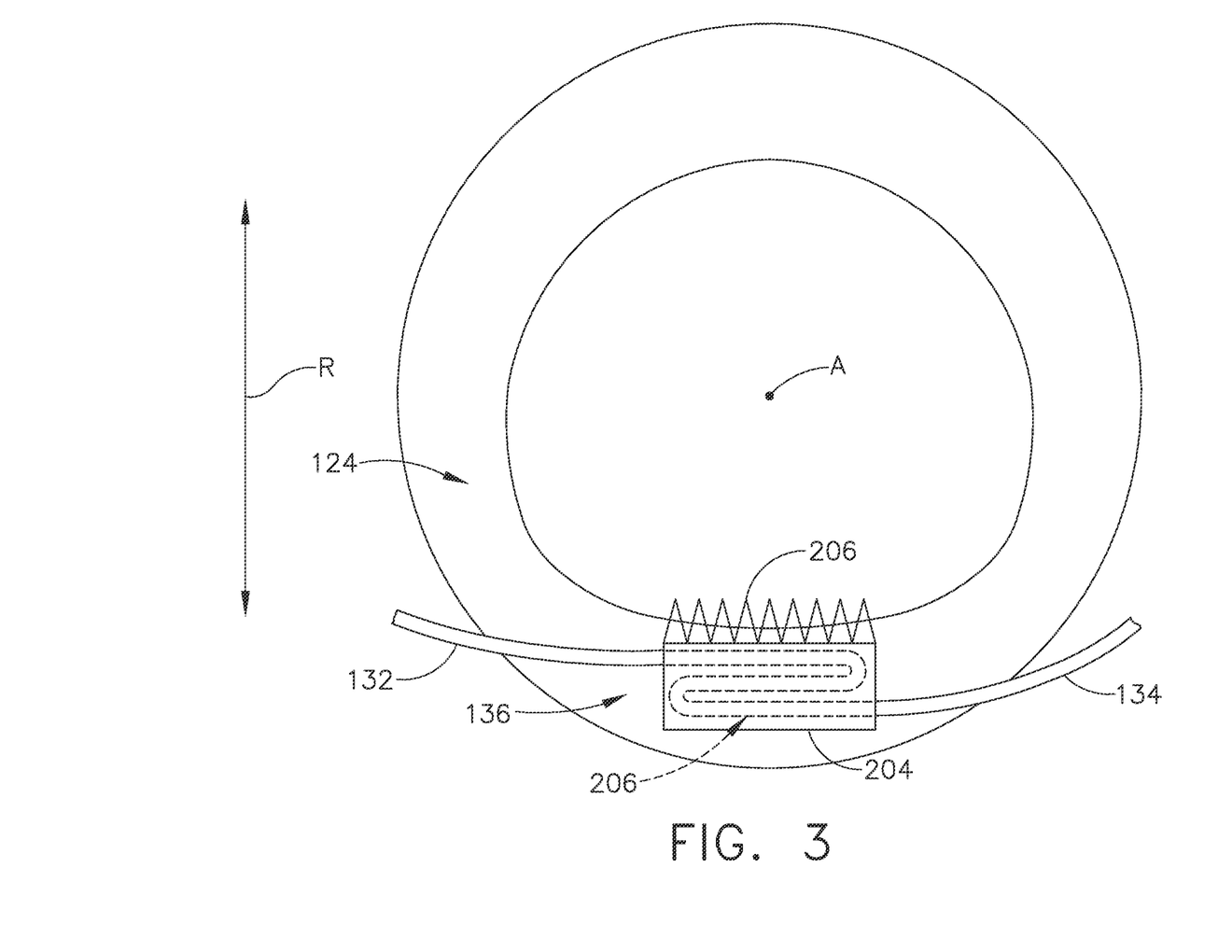
FIG. 3 is a cross-sectional end view of a collection chamber within a sump of the oil circulation system shown in FIG. 2.

In an alternative embodiment, heat exchanger 204 is formed integrally with at least one of sump members 112 and 114 and liner 120. Such a configuration of heat exchanger 204 includes heat dissipation features 206 such as channels formed therethrough or fins extending therefrom that are exposed to a cooling airflow to facilitate cooling the lubrication oil within heat exchanger 204. However, in other embodiments, heat exchanger 204 is integrated into a wall of forward sump 100 in any other suitable manner. For example, in other embodiments, heat exchanger 204 is integrated into a wall of forward sump 100 by attaching a plurality of cooling channels to an outside surface of the wall of forward sump 100 or alternatively to an inside surface of a wall of forward sump 100.

It should be appreciated, however, that in other exemplary embodiments, turbofan engine 10 may additionally include any other suitable number and/or configuration of heat exchangers. For example, in other exemplary embodiments, turbofan engine 10 may include a plurality of heat exchangers circumferentially spaced and/or axially spaced within collection chamber 124 of forward sump 100 or elsewhere in direct thermal communication with forward sump 100.

In the exemplary embodiment, self-contained oil circulation system 200 also includes an oil filter 208, an air/oil separator 210, and at least one pump 212 for providing motive force to the lubrication oil along conduit 202. As shown in FIG. 3, each of filter 208, separator 210, and pump 212 are positioned within sump 100 and coupled in fluid communication between bearings 108, 110, and 116 and heat exchanger 204. As such, circulation system 200 provides a self-contained system that collects, treats, pressurizes, and redistributed the lubrication oil completely within sump 100 without having to channel the lubrication oil through a scavenge line across core air flowpath 37 to treatment devices external to sump 100.

Heated lubrication oil is channeled from bearings 108, 110, and 116 to filter 208 for removal of any metal particles from the lubrication oil. In one embodiment, filter 208 includes a chip detector (not shown) that identifies metal chips over a predetermined size limitation. In the exemplary embodiment, circulation system 200 also includes air/oil separator 210 positioned in sump 100 and coupled in fluid communication between bearings 108, 110, and 116 and heat exchanger 204. During use in bearings 108, 110, and 116, the lubrication oil is entrained with a volume of air. Separator 210 facilitates removing the air volume from the lubrication oil and venting the air through a vent line 214 from sump 100 to core air flowpath 37. Alternatively, vent line 214 vents the air volume to any location, such as, but not limited to, the atmosphere or a downstream processing device. As described above, pump 212 is coupled in fluid communication with bearings 108, 110, and 116 and heat exchanger 204 and facilitates pressurizing the lubrication oil and providing motive force for the lubrication oil to be channeled between bearings 108, 110, and 116 and heat exchanger 204 via conduit 202. Although heat exchanger 204, filter 208, separator 210, and pump 214 are shown in one serial order in FIG. 3, the lubrication oil may be channeled through heat exchanger 204, filter 208, separator 210, and pump 214 in any order through circulation system 200 that facilitates operation of system 200 as described herein.

Figure 4:
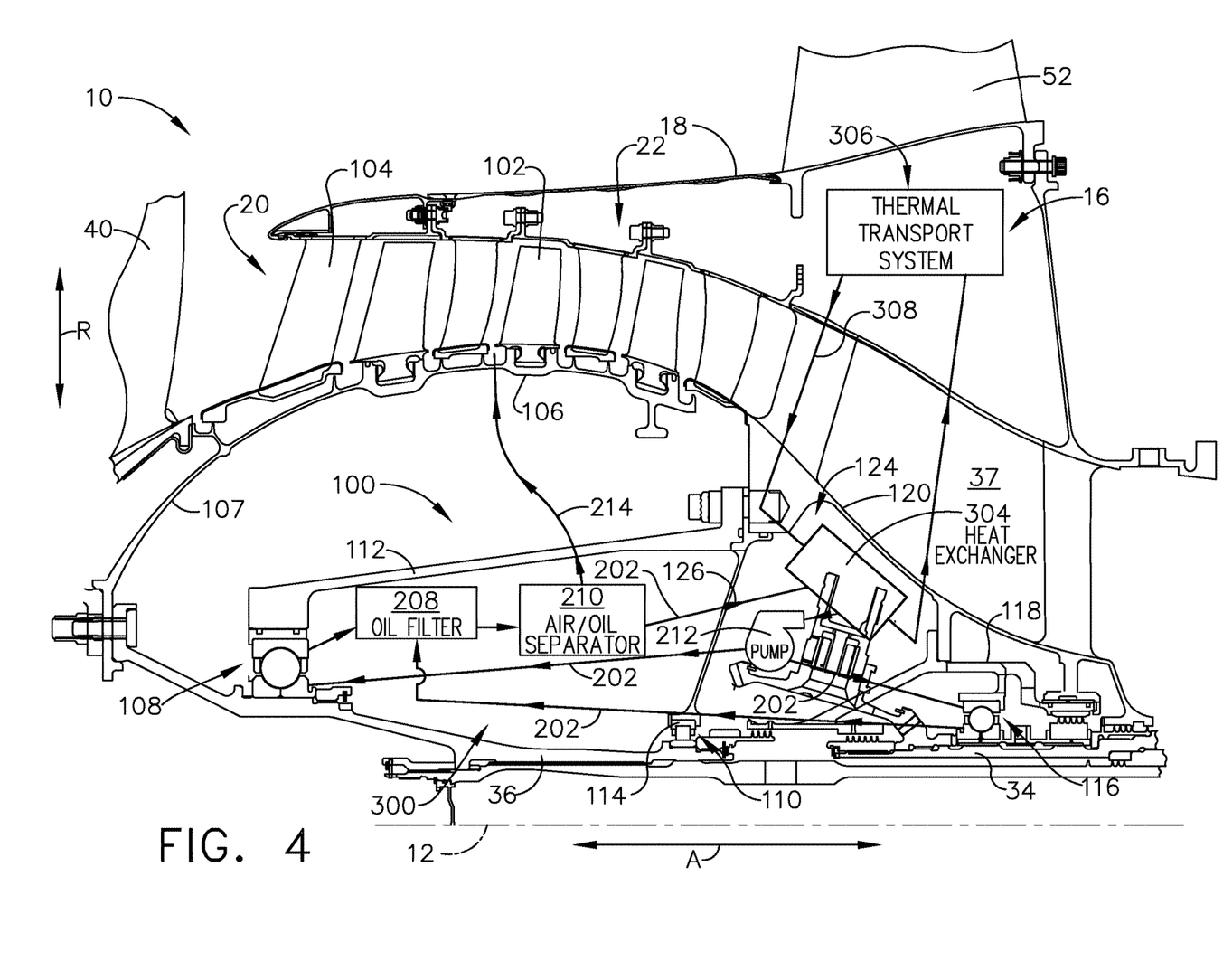
FIG. 4 is a schematic, cross-sectional side view of a forward end of a core of a gas turbine engine illustrating an alternative oil circulation system.

Referring now to FIG. 4, a schematic, cross-sectional view of a forward end of a turbofan engine 10 in accordance with another embodiment of the present disclosure is provided. Turbofan engine 10 of FIG. 4 is configured in substantially the same manner as turbofan engine 10 described above with reference to FIGS. 1 through 3. Accordingly, the same or similar numbering may refer to the same or functionally equivalent components.

As shown, turbofan engine 10 includes a first forward LP bearing assembly 108 and a second forward LP bearing assembly 110, each supporting rotation of an LP shaft 36 at a forward end. First and second forward LP bearing assemblies 108, 110 are attached at radially inner ends to LP shaft 36 and at radially outer ends to forward and aft LP frame members 114, 116, respectively. Additionally, turbofan engine 10 includes a forward HP bearing assembly 116 for supporting rotation of HP shaft 34 at a forward end. Forward HP bearing assembly 116 is attached to HP shaft 34 at a radially inner end and to a stationary HP frame member 118 at a radially outer end. Moreover, the various bearing assemblies are each positioned at least partially within a forward sump 100 positioned radially inward from core air flowpath 37.

Forward sump 100 depicted in FIG. 4 operates in substantially the same manner as forward sump 100 depicted in FIG. 2, in that forward sump 100 depicted in FIG. 4 includes a lubrication oil circulation system 300. Similar to lubrication oil circulation system 200, lubrication oil circulation system 300 includes a heat exchanger 304 positioned within sump 100. However, instead of heat exchanger 304 being configured as an air-to-liquid heat exchanger, as in lubrication oil circulation system 200, heat exchanger 304 in lubrication oil circulation system 300 is configured as a liquid-to-liquid heat exchanger. More particularly, for the embodiment depicted, lubrication oil circulation system 300 includes a closed-loop thermal transport system 306 coupled in fluid communication with heat exchanger 304. Thermal transport system 306 removes heat from the lubrication oil positioned within forward sump 100 of turbofan engine 10. Closed loop thermal transport system 306 circulates a thermal transport fluid through a thermal fluid transport fluid conduit 308, which flows through heat exchanger 304 to facilitate cooling the lubrication oil therein such that heat exchanger 304 transfers heat from the lubrication oil to the thermal transport fluid within the closed loop thermal transport system 306. Thermal transport system may also include various additional heat source heat exchangers (not shown) and heat sink heat exchangers (not shown) arranged in series and/or parallel flow.

Figure 5:
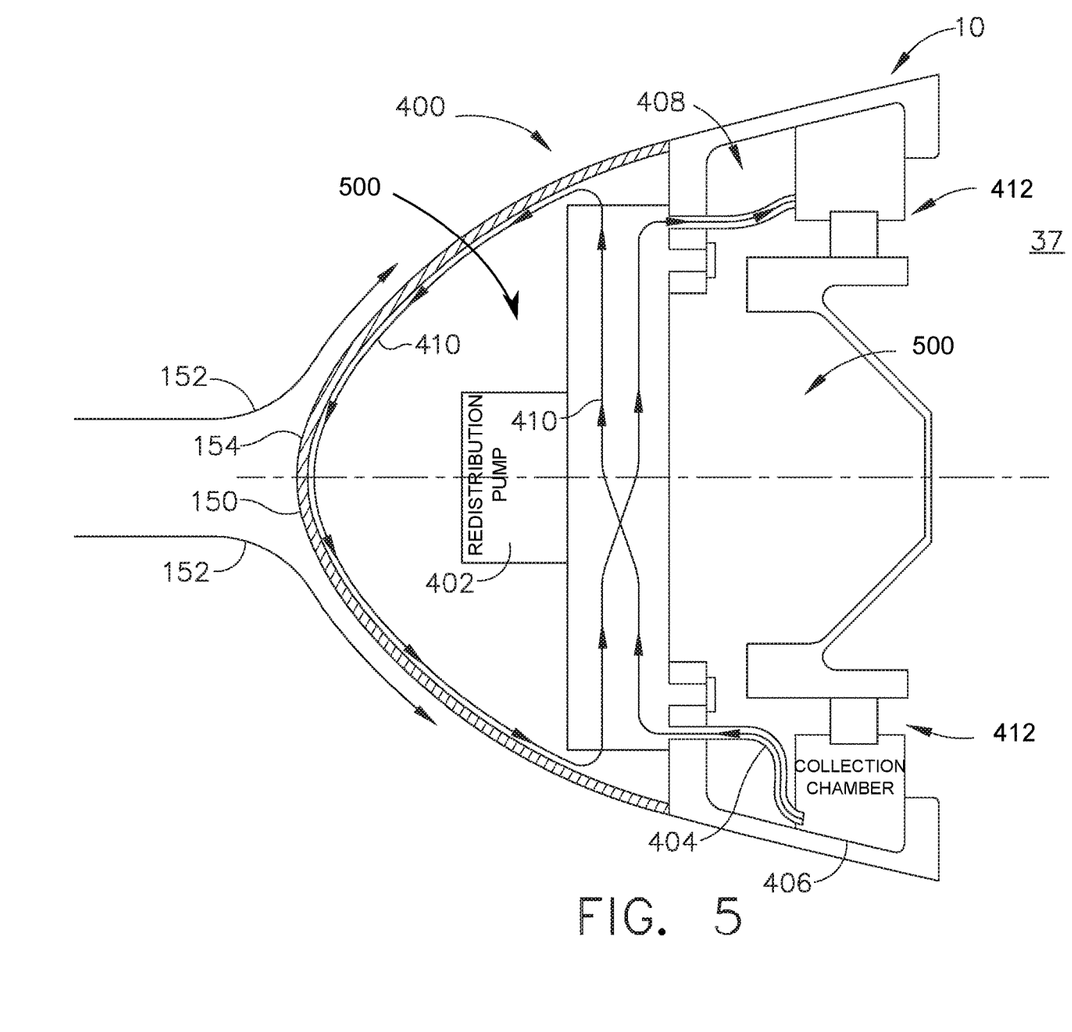
FIG. 5 is a schematic, cross-sectional view of a nose cone illustrating another alternative oil circulation system.

FIG. 5 is a schematic, cross-sectional view of a nose cone 150 illustrating another alternative oil circulation system 400. Nose cone 150 is exposed to an external airflow 152 that impinges and subsequently flows along an exterior wall 154 of nose cone 150. In the illustrated embodiment, nose cone 150 is coupled to a gas turbine engine 10 substantially similar to turbine engine 10 shown in FIGS. 1-4, with the primary difference being that nosecone 150 is stationary while spools 34 and 36 rotate about axis 12. Turbine engine 10 includes sump 500 positioned primarily within nose cone 150. Additionally, turbine engine 10 includes forward bearing assemblies 412 similar to those as shown in FIGS. 1-4 and a core air flowpath 37 downstream from sump 500. As shown, sump 500 is a fan sump positioned within nose cone 150 of turbine engine 10.

In the illustrated embodiment, circulation system 400 includes a redistribution pump 402 (e.g., a gear pump) positioned within nose cone 150 proximate exterior wall 154. In an alternative embodiment, pump 402 is a disc pump or a vane pump. Pump 402 includes a lubrication oil inlet 404 positioned within a collection chamber 406 proximate lower bearing 412 and a lubrication oil outlet 408 positioned proximate upper bearing 412. In operation, the lubrication oil is channeled around bearing 412 and collects in collection chamber 406. Pump 402 then draws the lubrication oil from collection chamber 406 and channels it through a lubrication oil conduit 410, along exterior wall 154 and to lubrication oil outlet 408. Because nosecone 150 is stationary, the channeling of the lubrication oil through conduit 410 proximate exterior wall 154 is at least partially due to gravity.

Exterior wall 154 of nose cone 150 also forms at least a portion of sump 500 and acts as a heat sink within circulation system 400 such that, as pump 402 channels the lubrication oil through conduit 410, external airflow 152 is in heat transfer communication with conduit 410 through wall 154 and facilitates cooling the lubrication fluid flowing within conduit 410. Accordingly, circulation system 400 channels the lubrication oil through conduit 410 entirely within sump 500 such that the lubrication oil is heat treated without being channeled across core air flowpath 37.

The exemplary apparatus and methods described herein overcome at least some disadvantages of known systems and methods for circulating a lubrication oil through a gas turbine engine. Moreover, the systems and methods described herein enable a sealed oil circulation system that includes in-sump lubrication pumping, filtration, and conditioning. More specifically, the self-contained circulation system described herein includes a sump configured to collect lubrication fluid and a heat source, such as bearings, coupled in fluid communication with the sump and configured to transfer heat to the lubrication fluid. The system also includes a heat sink, such as a heat exchanger, positioned within the sump and coupled in fluid communication with the heat source. A lubrication fluid conduit channels the lubrication fluid between the heat source and the heat sink, wherein the lubrication fluid conduit is positioned entirely within the sump such that the conduit channels lubrication fluid between various components of the oil circulation system without channeling the lubrication fluid across a core air flowpath of the gas turbine engine.

A technical effect of the above described oil circulation system is the ability to position the oil treatment devices of the circulation system within the sump to prevent channeling the lubrication fluid across a core air flowpath of the gas turbine engine. As such, less scavenge lines and pumps are necessary to channel the oil greater distances are required. Accordingly, the above described oil circulation system enables reducing both the weight and complexity of the aircraft engine. Additionally, because the above described oil circulation system is sealed within the sump, there are no fluid lines associated with the circulation system extending through the core air flowpath of the engine to an oil tank external to the sump. As such, the core air flowpath includes less blockage and enables an increase in engine efficiency. Another advantage of the above described oil circulation system is reduced under-cowl heat exchanger size and packaging requirements. By cooling the fluid in the sump and not piping any to an under-cowl mounted heat exchanger, more space is allotted up for other externals components.

Exemplary embodiments of self-contained oil circulation systems are described above in detail. The oil circulation systems, and methods of operating such systems and devices are not limited to the specific embodiments described herein, but rather, components of systems and/or steps of the methods may be utilized independently and separately from other components and/or steps described herein. For example, the methods may also be used in combination with other systems requiring oil circulation systems, and are not limited to practice with only the turbine engine system and methods as described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A self-contained lubrication fluid circulation system of a turbofan engine, the turbofan engine having a nacelle, a bypass airflow passage radially inward of the nacelle, an outer casing radially inward of the bypass airflow passage, the outer casing enclosing a core turbine engine, wherein the core turbine engine includes a core air flowpath radially inward of the outer casing and defined by a compressor section, a combustion section, a turbine section, and a nozzle section, the self-contained lubrication fluid circulation system being positioned in the core turbine engine radially inward of the core air flowpath and comprising:
- a sump configured to collect lubrication oil, the sump defining a collection chamber wherein the lubrication oil is configured to flow and collect;
- a heat source coupled in fluid communication with the sump and configured to transfer heat to the lubrication oil, wherein the heat source includes at least one bearing;
- a heat exchanger positioned entirely within the sump and coupled in fluid communication with the heat source, wherein the heat exchanger receives a cooling airflow flowing radially inward of the core air flowpath such that the cooling airflow passes through the heat exchanger before exhausting into the core air flowpath; and
- a lubrication fluid conduit configured to channel the lubrication oil between the heat source and the heat exchanger, the lubrication fluid conduit positioned entirely within the sump;
- wherein the self-contained lubrication fluid circulation system axially overlaps with the compressor section and is completely contained radially inward of the core air flowpath such that no lubrication oil enters the core air flowpath.

2. The system of claim 1, wherein the at least one bearing is coupled between a stationary component of the gas turbine turbofan engine and a rotating component of the gas turbine turbofan engine.

3. A self-contained lubrication fluid circulation system of a turbofan engine, the turbofan engine having a nacelle, a bypass airflow passage radially inward of the nacelle, an outer casing radially inward of the bypass airflow passage, a core air flowpath radially inward of the outer casing and defined by a compressor section, a combustion section, a turbine section and a nozzle section, the self-contained lubrication fluid circulation system being positioned radially inward of the core air flowpath and comprising:
- a sump configured to collect lubrication oil, the sump defining a collection chamber wherein the lubrication oil is configured to flow and collect, wherein the sump comprises a fan sump positioned within a nose cone of the turbofan engine;
- a heat source coupled in fluid communication with the sump and configured to transfer heat to the lubrication oil, wherein the heat source includes at least one bearing;
- a heat exchanger comprising a sump wall that is an exterior wall of the nose cone exposed to an external airflow and coupled in fluid communication with the heat source; and
- a lubrication fluid conduit configured to channel the lubrication oil between the heat source and the heat exchanger, the lubrication fluid conduit positioned entirely within the sump;
- wherein the self-contained lubrication fluid circulation system is completely contained radially inward of the core air flowpath such that no lubrication oil contained within the self-contained lubrication fluid circulation system enters the core air flowpath.

4. The system of claim 1, wherein the heat exchanger is an air-to-liquid heat exchanger configured to receive the cooling airflow from the turbofan engine and to transfer heat from the lubrication oil in the sump to the cooling airflow.

5. The system of claim 1, further comprising a lubrication fluid filter positioned within the sump and coupled in fluid communication with the heat exchanger via the lubrication fluid conduit.

6. The system of claim 1, further comprising a redistribution pump positioned within the sump and coupled in fluid communication with the heat source and the heat exchanger, the redistribution pump configured to pressurize and channel the lubrication between the heat source and the heat exchanger.

7. The system of claim 6, wherein the redistribution pump comprises one of a gear pump, a disc pump, and a vane pump.

8. The system of claim 3, wherein the heat exchanger is integrated into at least one wall of the sump.

9. The system of claim 1, further comprising an air/lubrication fluid separator positioned within the sump and coupled in fluid communication with the heat exchanger and the heat source.

10. The system of claim 9, further comprising a vent line coupled in fluid communication with the air/lubrication fluid separator, the vent line configured to channel air from the sump.

11. A method of treating a lubrication oil flowing in a turbofan engine having a nacelle, a bypass airflow passage radially inward of the nacelle, an outer casing radially inward of the bypass airflow passage, the outer casing enclosing a core turbine engine, wherein the core turbine engine includes a core air flowpath radially inward of the outer casing and defined by a compressor section, a combustion section, a turbine section and a nozzle section, and a self-contained lubrication fluid recirculation system positioned in the core turbine engine radially inward of the core air flowpath, the method comprising:
- channeling lubrication oil from a heat source to a sump via a lubrication fluid conduit, wherein the heat source transfers heat to the lubrication oil;
- collecting the lubrication oil within a chamber defined by the sump;
- channeling the lubrication oil via the lubrication fluid conduit to a heat exchanger positioned entirely within and coupled in fluid communication with the sump, wherein the heat exchanger receives a cooling airflow flowing radially inward of the core air flowpath such that the cooling airflow passes through the heat exchanger before exhausting into the core air flowpath; and
- channeling the lubrication oil via the lubrication fluid conduit from the heat exchanger to the heat source, wherein the self-contained lubrication fluid circulation system axially overlaps with the compressor section and is completely contained radially inward of the core air flowpath such that the lubrication oil does not enter the core air flowpath.

12. The method of claim 11, further comprising channeling the cooling airflow from the turbofan engine through the heat exchanger to transfer heat from the lubrication oil in the sump to the cooling airflow.

13. The method of claim 11, further comprising channeling the lubrication oil through a lubrication fluid filter positioned within the sump and coupled in fluid communication with the heat exchanger via the lubrication fluid conduit.

14. The method of claim 11, further comprising channeling the lubrication oil through a redistribution pump positioned within the sump and coupled in fluid communication with the heat source and the heat exchanger, the redistribution pump configured to pressurize and channel the lubrication oil between the heat source and the heat exchanger.

15. The method of claim 11, further comprising:
channeling the lubrication oil through an air/lubrication fluid separator positioned within the sump and coupled in fluid communication with the heat exchanger and the heat source, wherein the separator is configured to separate the lubrication oil from air entrained within; and
channeling the air through a vent line coupled in fluid communication with the air/lubrication fluid separator from the sump.

* * * * *